US011653297B2

(12) United States Patent
Takekawa et al.

(10) Patent No.: US 11,653,297 B2
(45) Date of Patent: May 16, 2023

(54) WIRELESS COMMUNICATION SYSTEM, WIRELESS COMMUNICATION METHOD, AND MOBILE VEHICLE

(71) Applicant: HITACHI KOKUSAI ELECTRIC INC., Tokyo (JP)

(72) Inventors: Masayuki Takekawa, Tokyo (JP); Tatsuya Abe, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 17/794,410

(22) PCT Filed: Feb. 17, 2020

(86) PCT No.: PCT/JP2020/006008
§ 371 (c)(1),
(2) Date: Jul. 21, 2022

(87) PCT Pub. No.: WO2021/166025
PCT Pub. Date: Aug. 26, 2021

(65) Prior Publication Data
US 2023/0048435 A1   Feb. 16, 2023

(51) Int. Cl.
*H04W 24/10* (2009.01)
*H04W 48/18* (2009.01)

(52) U.S. Cl.
CPC ........... *H04W 48/18* (2013.01); *H04W 24/10* (2013.01)

(58) Field of Classification Search
CPC ...... H04W 48/18; H04W 24/10; H04W 48/16
See application file for complete search history.

(56) References Cited

U.S. PATENT DOCUMENTS

| 11,284,305 | B1* | 3/2022 | Parihar | ............... H04L 5/0064 |
| 2022/0022120 | A1* | 1/2022 | Yang | ................. H04W 72/21 |
| 2022/0124741 | A1* | 4/2022 | Elshafie | .............. H04L 5/0057 |

FOREIGN PATENT DOCUMENTS

| JP | 2003-124854 A | 4/2003 |
| JP | 2010-199717 A | 9/2010 |

(Continued)

OTHER PUBLICATIONS

International Search Report dated Jul. 14, 2020.

*Primary Examiner* — Chuong A Ngo
(74) *Attorney, Agent, or Firm* — Bacon & Thomas, PLLC (57) ABSTRACT

An unmanned mobile vehicle M acquires the line quality of a wireless communication line to each of the corresponding base stations having been measured by each mobile station and transmits the line quality to a control station 30. The control station 30 acquires the line quality of a wireless communication line to each of the corresponding mobile stations having been measured by each base station and transmits the line quality to the unmanned mobile vehicle M. When the same communication data is transmitted using two or more wireless communication lines in combination between the control station 30 and the unmanned mobile vehicle M, the transmitting side of the communication data selects two or more wireless communication lines that are used for the transmission of the communication data, on the basis of the line quality of each wireless communication line having been measured by each base station or each mobile station on the receiving side of the communication data.

7 Claims, 4 Drawing Sheets

(56) References Cited

FOREIGN PATENT DOCUMENTS

| JP | 2019-169848 A | 10/2019 |
| WO | WO2017/018021 A1 | 2/2017 |
| WO | WO2019/116491 A1 | 6/2019 |

\* cited by examiner

WIRELESS COMMUNICATION SYSTEM, WIRELESS COMMUNICATION METHOD, AND MOBILE VEHICLE

TECHNICAL FIELD

The present disclosure relates to a wireless communication system performing route diversity transmission between a mobile vehicle and an integrated control device.

BACKGROUND

Recent advances in robotics technology are truly remarkable, and robots are being increasingly employed to solve various social problems. Most of these robots are unmanned vehicles, such as drones or self-driving cars. An unmanned vehicle needs to be provided with a communication system to receive control command data remote autonomous driving or transmit image data taken by the camera mounted on the unmanned vehicle. At this time, except for those cases in which the unmanned vehicle simply moves along a predetermined path such as a rail, wireless communication suitable for mobile applications is commonly utilized.

For example, Patent Document 1 describes a disclosure that a mobile base station and a terminal have a long-distance communication function for preparing short-range communication and a short-range communication function for data transmission and schedule the timing of performing short-range communication by communication based on the long-distance communication function. Also, Patent Document 2 describes a disclosure for a relay system using an unmanned aerial vehicle that searches for a relay position of the unmanned aerial vehicle based on communication quality of the relay, scheduled relay time, and state of a power supply of the unmanned aerial vehicle (the amount of power that may be supplied).

PRIOR ART DOCUMENTS

Patent Documents

Patent Document 1: International Publication No. 2017/018021
Patent Document 2: Japanese Laid-Open Patent Publication No. 2019-169848

SUMMARY

Problems to Be Resolved by the Invention

Wireless communication involving unmanned mobile vehicles often employs a wireless communication system operating in a radio band that allows a license-free use, such as the Industrial, Scientific, and Medical (ISM) band. However, in an environment in which a large number of users exist, there is a high risk of occurrence of communication abnormalities due to interference and the like. In consideration of such a situation, institutionalization and operational adjustment of unmanned mobile vehicle image transmission systems are being implemented for robot radio stations. In addition, for the safe use and utilization of robots, communication systems are requested to provide much higher reliability.

As one of the techniques to realize highly reliable communication, a route diversity transmission technique using redundant transmission is used. The route diversity transmission technique transmits the same data through a plurality of communication routes between a data transmitting side and receiving side and aggregates the information arriving through the plurality of communication routes at the data receiving side. In this manner, it is possible to improve data reachability by taking advantage of variations in the line quality of communication systems constituting the communication routes.

The route diversity transmission technique transmits communication data through a plurality of communication systems highly expected to have different line quality. Thus, even if one communication system deteriorates in its line quality and fails to transmit data, the data may still be transmitted through another communication system. On this ground, it is possible to improve the reachability of control command data or video data by mounting mobile radio equipment for a plurality of wireless communication systems on an unmanned mobile vehicle such as a drone and applying the route diversity transmission technique using a plurality of wireless communication lines. This approach enables a transmitting side radio station to transmit the same communication data through a plurality of wireless communication lines available at a particular time, thereby expecting the data to reach the receiving side through at least one wireless communication line.

Meanwhile, the line quality of wireless communication is affected by propagation characteristics (e.g., attenuation due to distance, shielding, and multipath propagation and the like) between the transmitting and receiving side radio stations. Also, the receiving side radio station is particularly affected by radio wave interference originating from other radio devices or other facilities. At this time, it is commonly observed that the situation of radio wave interference received from other radio devices (the situation of being influenced) is different for the transmitting side radio station and the receiving side radio station, respectively.

The situation of being influenced differs due to geographical locations not only for a Frequency Division Duplex (FDD) system in which uplink and downlink frequencies are different but also for a Time Division Duplex (TDD) system in which uplink and downlink channels use the same frequency. In other words, a wireless communication line exposed to little interference when used by a transmitting side radio station may suffer considerable interference when used for a receiving side radio station, or vice versa. In addition, when the receiving side radio station always receives interference of a specific frequency, it may not necessarily be said that all wireless communication lines are effectively utilized.

Also, in the case of a communication system using a Listen Before Talk-type media access control method such as the Carrier Sense Multiple Access (CSMA), the following problem may also occur. In other words, if data is also transmitted on a wireless communication line that does not contribute to the improvement of communication quality, a radio station that lies within a reachable range of radio waves emitted from a transmitting side radio station and uses the same frequency is determined as a busy channel by the carrier sense function and the like. As a result, other radio stations using the same frequency are deprived of an opportunity for transmission (in other words, systematic frequency utilization efficiency is lowered). Particularly, since a radio station mounted on an aerial vehicle such as a drone is used in an environment with fewer shielding objects than a radio station operated on the ground, emitted radio waves reach a far distance, and the systemic frequency utilization efficiency is likely to decrease.

An approach may be conceived to solve the problem above, which enables the transmitting and receiving sides to recognize the radio environment and perform communication using a frequency exerting little interference on both the transmitting and receiving sides. However, when a plurality of mobile stations is connected to one base station, it is often the case that not all radio stations connected to the system may adopt the frequency with little interference.

Similarly, when a protocol for performing arrival confirmation is adopted for each wireless communication line involved in the route diversity transmission, a particular wireless communication line often exhibits good line quality only in one direction (for example, uplink direction) but poor line quality in the opposite direction (in this example, downlink direction opposite to the uplink). In this case, even if the main data transmitted through the uplink showing good communication quality arrives, since an arrival confirmation signal sent to the downlink is not received, a retransmission frequency in the corresponding wireless communication line increases. In other words, when the line quality of a wireless communication line differs depending on the communication directions (uplink or downlink) of two-way communication, there is a possibility that frequency resource utilization efficiency decreases.

The present disclosure has been made to solve the conventional problems above and intends to enable a wireless communication system employing route diversity transmission techniques to effectively utilize frequency resources even when communication quality differs depending on the communication direction.

Means for Solving the Problem

To achieve the object above, a wireless communication system according to the present disclosure is composed as follows.

In other words, a wireless communication system according to the present disclosure comprises a mobile vehicle mounted with a plurality of mobile stations corresponding respectively to a plurality of wireless communication lines and an integrated control device connected to each base station of the plurality of wireless communication lines through a network. The mobile vehicle transmits the line quality of a wireless communication line, measured by each mobile station mounted on the mobile vehicle, between the mobile station and the corresponding base station to the integrated control device. The integrated control device transmits the line quality of a wireless communication line, measured by each base station connected to the integrated control device, between the base station and the corresponding mobile stat ion to the mobile vehicle. When the same communication data are transmitted between the integrated control device and the mobile vehicle using two or more wireless communication lines in combination, the transmitting side of the communication data selects a wireless communication line used for transmission of the communication data based on the line quality of each wireless communication line measured by each base station or each mobile station of the receiving side of the communication data.

Here, as an example of one configuration, the transmitting side of communication data may not select a wireless communication line whose line quality at the receiving side is lower than a predetermined threshold as the wireless communication line used for transmitting the communication data.

Also, as an example of another configuration, the transmitting side of communication data may select a wireless communication line used for transmitting the communication data, according to predetermined priorities, among wireless communication lines whose line quality at the receiving side is higher than a predetermined threshold.

Also, as an example of another configuration, the transmitting side of communication data may select a wireless communication line used for transmitting the communication data, randomly, among wireless communication lines whose line quality at the receiving side is higher than a predetermined threshold.

Also, as an example of another configuration, the transmitting side of communication data may select a wireless communication line used for transmitting the communication data in order of the highest line quality at the receiving side.

Effect of the Invention

According to the present disclosure, in a wireless communication system using a route diversity transmission technique, it is possible to effectively utilize frequency resources even in a situation where communication quality is different depending on communication directions. As a result, it becomes possible to provide wireless communication with high efficiency and reliability.

BRIEF DESCRIPTION OF THE DRAWINGS

FIG. illustrates a structure of a wireless communication system according to one embodiment of the present disclosure.

DETAILED DESCRIPTION

In what follows, one embodiment of the present disclosure will be described in detail with reference to appended drawings.

(Overview of Wireless Communication System)

FIG. illustrates a structure of wireless communication system according to one embodiment of the present disclosure. The wireless communication system shown in FIG. 1 comprises an unmanned mobile vehicle M, BSs 10-12, MSs 20-22, a control station 30, a terminal integrated controller 40, the Internet 50, and operation command equipment 60. The wireless communication system of the present example employs route diversity transmission for the transmission communication data between the unmanned mobile vehicle M and the control station 30.

Figure 1:
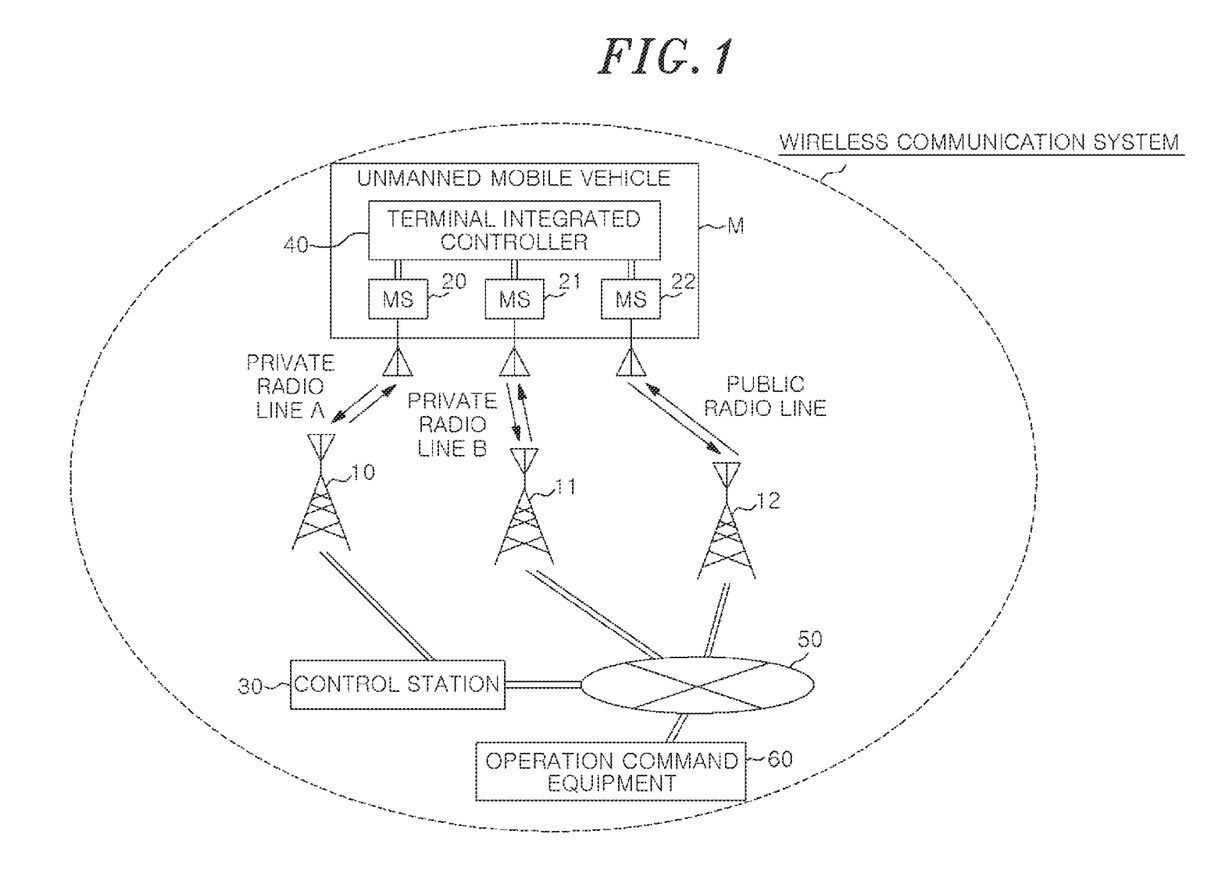

The MSs 20 to 22 are mobile stations mounted on an unmanned mobile vehicle M equipped with an autonomous navigation means, such as an unmanned aerial vehicle or a self-driving vehicle. The MSs 20 to 22 use, for example, a wireless communication terminal such as a sub-station or a mobile phone. The BSs 10-12 are base stations to which the mobile stations (MSs) 20 to 22 are connected. The control station 30 manages an unmanned mobile vehicle or a plurality of wireless communication lines. The terminal integrated controller 40 is mounted on the unmanned mobile vehicle M together with the MSs 20 to 22 and controls the MSs 20 to 22. The operation command equipment 60 remotely controls the operation of the unmanned mobile vehicle M by wireless communication through the control station 30.

Wireless communication between BS 10 and MS 20 is performed by a communication method in which uplink communication (uplink) and downlink communication (downlink) are performed at the same frequency. The same is true for wireless communication between BS 11 and MS 21 and between BS 12 and MS 22. BS 10 is a base station for private radio line A, BS 11 is a base station for private radio line B, and BS 12 is a base station for a public radio line. FIG. 1 shows an example in which one base station is provided for one wireless communication line, but, in general, a plurality of base stations is provided for one wireless communication line. The BSS 10 to 12 are communicatively connected to the control station 30 via a network. Also, the network, which connects BS 11 and BS 12 to the control station 30, includes the Internet 50.

(Detailed Structure of BSs 10 to 12)

Figure 2:
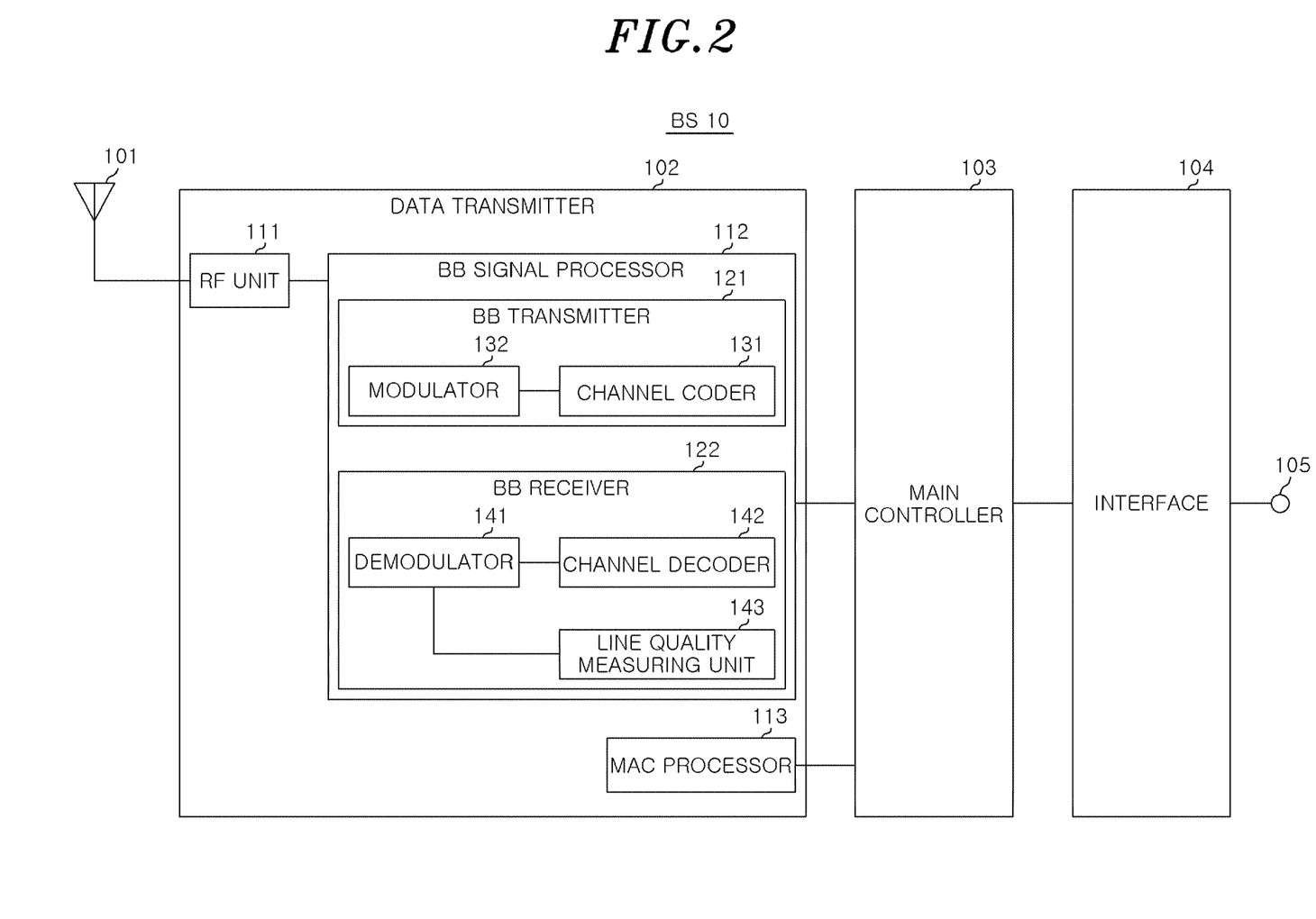
FIG. 2 illustrates an example of a base station in the wireless communication system of FIG. 1.

In what follows, the structure of BS 10 will be described with reference to FIG. 2. Since BS 11 and BS 12 are built on the same structure of BS 10, descriptions thereof will be omitted.

The BS 10 comprises an antenna 101, a data transmitter 102, a main controller 103, an interface 104, and a terminal 105. The antenna 101 is used for transmission and reception of radio waves. The data transmitter 102 performs data transmission and reception processing. The main controller 103 controls the entire station. The interface 104 provides an interface with an external line or an external device. The terminal 105 is used for connection with an external line or an external device.

The data transmitter 102 comprises a radio frequency (RF) unit 111, a baseband (BB) signal processor 112, and a medium access control (MAC) processor 113.

The RF unit 111 performs processing such as frequency conversion from baseband to a radio frequency band, frequency conversion from the radio frequency band to the baseband, and signal amplification.

The BB signal processor 112 comprises a BB transmitter 121 and a BB receiver 122. The BB transmitter 121 includes a channel coder 131 for performing channel coding and a modulator 132 for performing modulation. The BB receiver 122 includes a demodulator 141 for performing demodulation, a channel decoder 142 for performing channel decoding, and a line quality measuring unit 143 for measuring the quality of a wireless communication line. The line quality measuring unit 143 includes, for example, the Received Signal Strength Indicator (RSSI) and Carrier-to-Interference and Noise power Ratio (CINR) of the wireless communication line to which the base station is connected and reports the measurements to the main controller 103.

The MAC processor 113 controls the frequency channel used by the base station and data transmission/reception timing, adds a base station identifier to communication packets, detects errors in received packets, and recognizes a wireless device of a data transmission source.

The main controller 103 may be configured by, for example, a processor, a data storage area defined on a memory, and software. Also, the processor of the main controller 103 may implement the processes of the SB signal processor 112 and the MAC processor 113 by, for example, retrieving a program recorded in a data storage device such as a hard disk or a flash memory onto the memory and executing the retrieved program.

(Detailed Structure of MSs 20 to 22)

Figure 3:
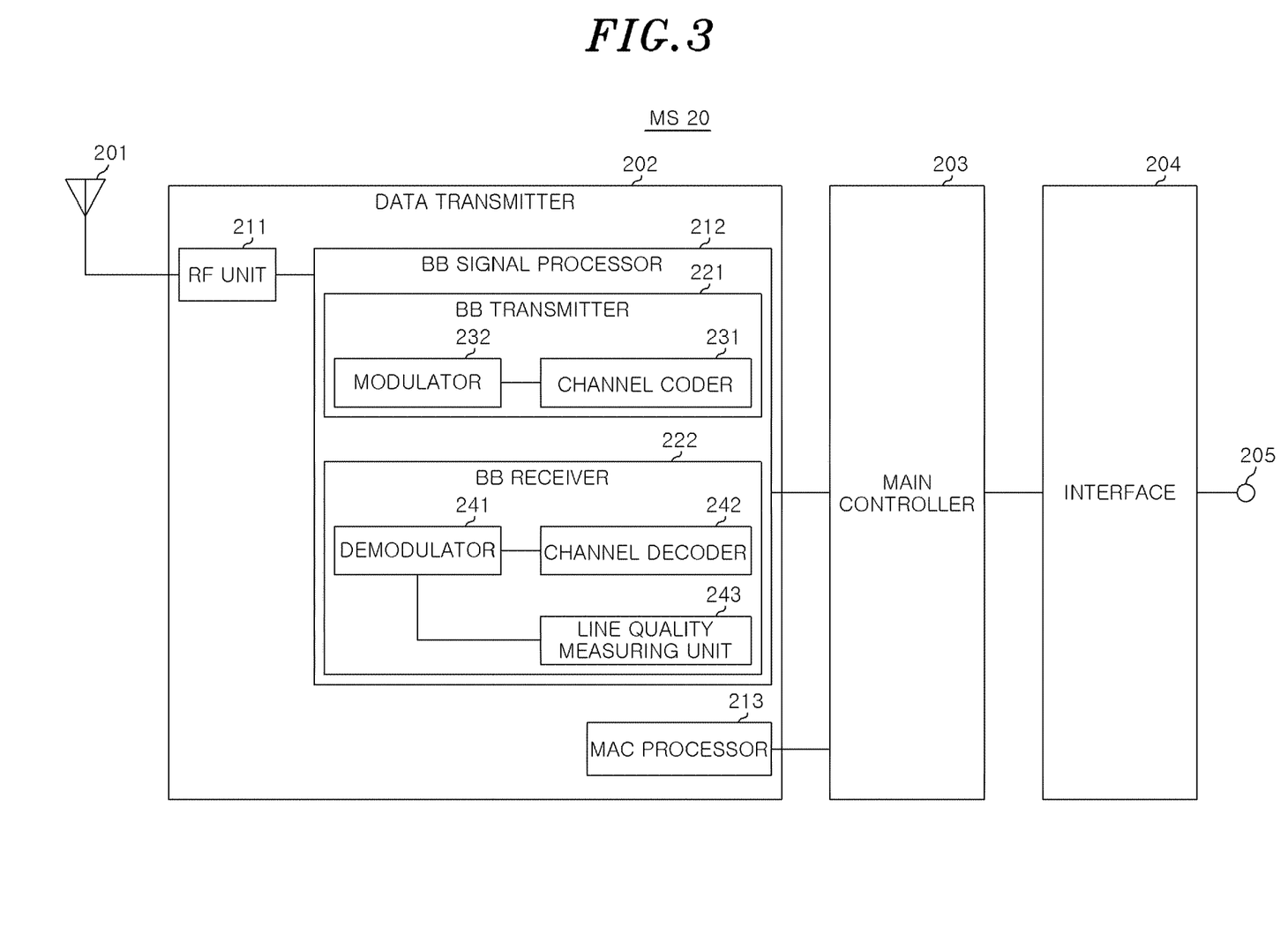
FIG. 3 illustrates an example of a mobile station in the wireless communication system of FIG. 1.

In what follows, the structure of MS 20 will be described with reference to FIG. 3. Since MS 21 and MS 22 are built on the same structure of MS 20, descriptions thereof will be omitted.

The MS 20 comprises an antenna 201, a data transmitter 202, a main controller 203, an interface 204, and a terminal 205. The antenna 201 is used for transmission and reception of radio waves. The data transmitter 202 performs data transmission and reception processing. The main controller 203 controls the entire station. The interface 204 provides an interface with an external line or an external device. The terminal 205 is used for connection with an external line or an external device.

The data transmitter 202 comprises an RF unit 211, a baseband (BB) signal processor 212, and a MAC processor 213.

The RF unit 211 performs processing such as frequency conversion from baseband to a radio frequency band, frequency conversion from the radio frequency band to the baseband, and signal amplification.

The BB signal processor 212 comprises a BB transmitter 221 and a BB receiver 222. The BB transmitter 221 includes a channel coder 231 for performing channel coding and a modulator 232 for performing modulation. The BB receiver 222 includes a demodulator 241 for performing demodulation, a channel decoder 242 for performing channel decoding, and a line quality measuring unit 243 for measuring the quality of a wireless communication line. The line quality measuring unit 243 includes, for example, RSSI and CINR of the wireless communication line to which the base station is connected and reports the measurements to the main controller 103.

The MAC processor 213 controls the frequency channel used by the base station and data transmission/reception timing, adds a base station identifier to communication packets, detects errors in received packets, and recognizes a wireless device of a data transmission source.

The main controller 203 may be configured by, for example, a processor, a data storage area defined on a memory, and software. Also, the processor of the main controller 203 may implement the processes of the BB signal processor 212 and the MAC processor 213 by, for example, retrieving a program recorded in a data storage device such as a hard disk or a flash memory onto the memory and executing the retrieved program.

(Detailed Structure of Control Station 30)

In what follows, the structure of the control station 30 will be described with reference to FIG. 4.

The control station 30 comprises a communication state manager 301, a packet transmission controller 302, line terminators 303 to 305, an interface 306, and a terminal 307.

The communication state manager 301 stores in a memory the connection state of a wireless communication line between. MSs 20 to 22 and BSs 10 to 12 mounted on the unmanned mobile vehicle M and the system participation state of the unmanned mobile vehicle M. The packet transmission controller 302 performs transmission and aggregation control of communication data packets transmitted using a plurality of wireless communication lines and relays communication between BSs 10 to 12, the Internet 50, and the operation command equipment 60. The line terminators 303 to 305 perform data transmission control specific to each wireless communication line or tracks changes in the IP addresses of the MSs 20 to 22. The interface 306 provides an interface with an external line or an external device. The terminal 307 is used for connection with an external line or an external device.

The line terminator 303 is connected to BS 10 and terminates private radio line A. The line terminator 304 is connected to BS 11 and terminates private radio line B. The line terminator 305 is connected to BS 12 and terminates a public radio line.

(Detailed Structure of Terminal Integrated Controller 40)

Figure 4:
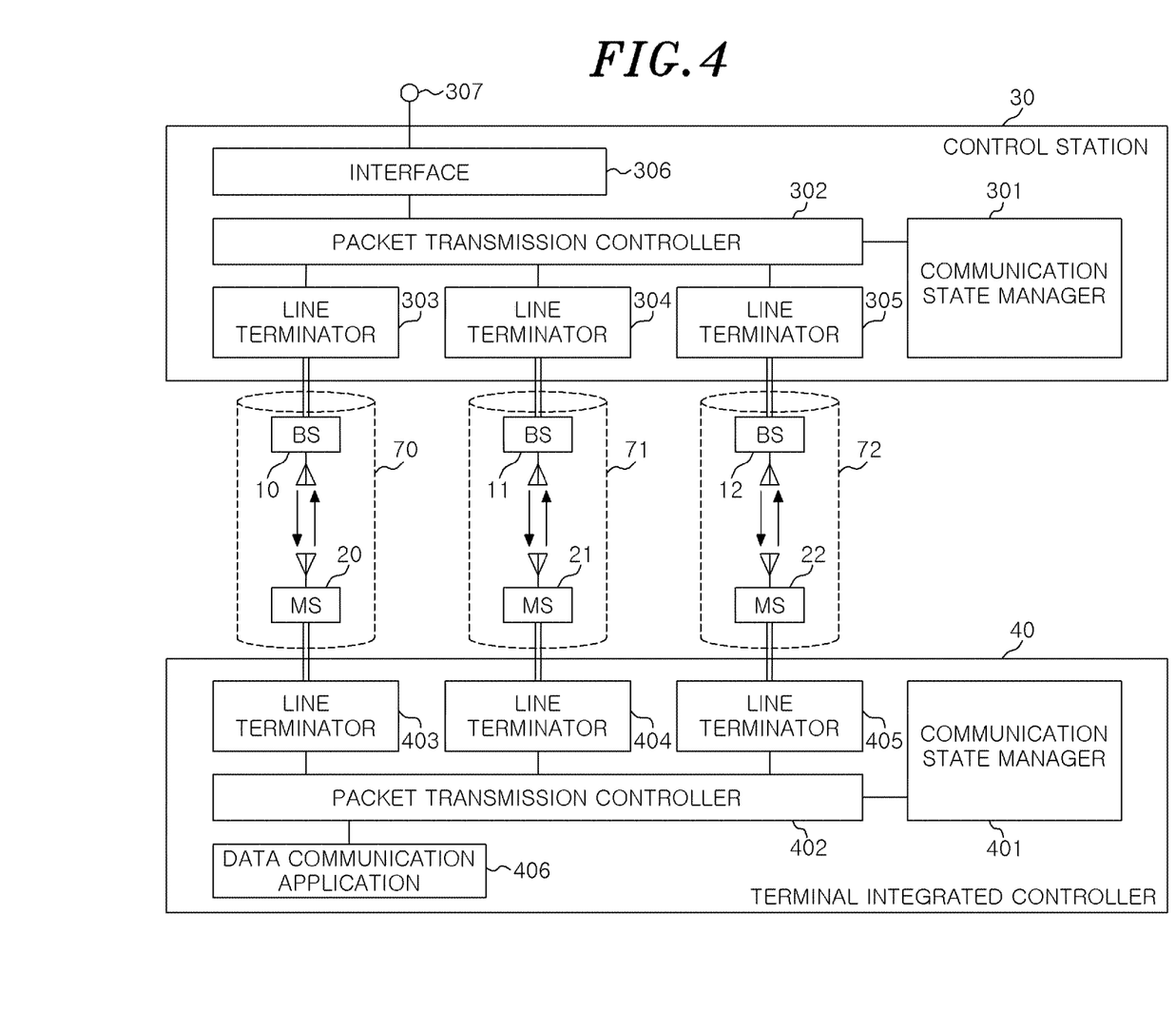
FIG. 4 illustrates an example of a control station and a terminal integrated controller in the wireless communication system of FIG. 1.

In what follows, the structure of the terminal integrated controller 40 mounted on an unmanned mobile vehicle M will be descried with reference to FIG. 4.

The terminal integrated controller 40 comprises a communication state manager 401, a packet transmission controller 402, line terminators 403 to 405, and a data communication application 406.

The communication state manager 401 stores in a memory the connection state of a wireless communication line between MSs 20 to 22 and BSs 10 to 12 and the system participation state of the vehicle itself. The packet transmission controller 402 performs transmission and aggregation control of communication data packets transmitted using a plurality of wireless communication lines. The line terminators 403 to 405 perform data transmission control specific to each wireless communication line or tracks changes in the IP addresses of the MSs 20 to 22. The data communication application 406 performs data communication with the Internet 50 and the operation command equipment 60.

The line terminator 403 is connected to MS 20 and terminates private radio Line A. The line terminator 404 is connected to MS 21 and terminates private radio line B. The line terminator 405 is connected to MS 22 and terminates a public radio line.

(Construction of a Communication Route and Management of Connection Between Terminal Integrated Controller 40 and Control Station 30)

In what follows, tunnel construction between the control station 30 and the terminal integrated controller 40 will be described with reference to FIG. 4. Here, a tunnel refers to a closed, virtual line directly connecting two points on a communication network.

The line terminator 403 performs tunneling with the line terminator 303 via MS 20 and BS 10 and establishes private radio line A tunnel 70. The line terminator 404 performs tunneling with the line terminator 304 via MS 21, BS 11, and the Internet 50 and establishes private radio line B tunnel 71. The line terminator 405 performs tunneling with the line terminator 303 via MS 22, BS 12, and the Internet 50 and establishes a public radio line tunnel 72.

The communication state manager 401 of the terminal integrated controller 40 transmits a connection request message to the communication state manager 301 of the control station 30 while being at the stage that any one of the tunnels 70 to 72 has been established. The communication state manager 301 that has received the connection request message transmits a connection permission message to the communication state manager 401, thus establishing a communication session between the control station 30 and the terminal integrated controller 40.

(Quality Control of Wireless Communication Line Between Terminal Integrated Controller 40 and Control Station 30)

In what follows, a line state management function for the terminal integrated controller 40 and the control station 30 will be described with reference to FIG. 4. At this time, it is assumed that a communication session has been established between the control station 30 and the terminal integrated controller 40.

The communication state manager 401 of the terminal integrated controller 40 periodically (e.g., at the period of 1 second) obtains a link state (connection/disconnection), RSSI, CINR, and an operating frequency from MSs 20 to 22 as a line state of each wireless communication line through the following operations.

The line state of private radio line A is obtained via the line terminator 403 from MS 20.

The line state of private radio line B is obtained via the line terminator 404 from MS 21.

The line state of a public radio line is obtained via the terminator 405 from MS 22.

The communication state manager 401 periodically (e.g., at the period of 1 second) reports the line state of each wireless communication line to the communication state manager 301 of the control station 30 using the tunnels 70 to 72 established by the line terminators 403 to 405.

The communication state manager 301 of the control station 30 periodically (e.g., at the period of 1 second) obtains a link state (connection/disconnection), RSSI, CINR, and an operating frequency from BSs 10 to 12 as a line state of each wireless communication line through the following operations.

The line state of private radio line A is obtained via the line terminator 303 from BS 10.

The line state of private radio line B is obtained via the line terminator 304 from BS 11.

The line state of a public radio line is obtained via the line terminator 305 from BS 12.

Here, in the presence of a plurality of unmanned mobile vehicles P within the system, the communication state manager 301 obtains a line state between itself and an MS mounted on each unmanned mobile vehicle M using an identifier (e.g., MAC address) corresponding to each unmanned mobile vehicle M. Then, the communication state manager 301 periodically (e.g., at the period of 1 second) reports the line state of each wireless communication line to the communication state manager 401 of the terminal integrated controller 40 using the tunnels 70 to 72 established by the line terminators 303 to 305. At this time, as the line quality reported by the communication state manager 301, the information on the line quality obtained in response to the identifier of the unmanned mobile vehicle M mounted with the terminal integrated controller 40 serving as a reporting counterpart is selected.

Through the process above, the line qualities of three wireless communication lines-private radio line A, private radio line B, and a public radio line-become known between the communication state manager 301 and the communication state manager 401.

(Communication Route Between Terminal Integrated Controller 40 and Operation Command Equipment 60)

In what follows, a communication route between a data communication application 406 of the terminal integrated controller 40 and the operation command equipment 60 will be described with reference to FIG. 6.

Communication data from the data communication application 406 of the terminal integrated controller 40 to the operation command equipment 60 are transmitted by the packet transmission controller 402 to the three communication routes of the tunnels 70 to 72. These communication data are aggregated by the packet transmission controller 302 of the control station 30 and then reach the operation command equipment 60 via the interface 306 and the Internet 50.

After reaching the interface 306 of the control station 30 via the Internet 50, communication data from the operation command equipment 60 to the data communication application 406 of the terminal integrated controller 40 are transmitted to the three communication routes of the tunnels 70 to 72 by the packet transmission controller 302. After being aggregated by the packet transmission controller 402 of the terminal integrated controller 40, these communication data reach the data communication application 406.

According to the process above, data communication between the terminal integrated controller 40 and the operation command equipment 60 is performed based on a configuration that always involves a communication route passing through the control station 30. In the present embodiment, the section to which route diversity transmission is applied is between the packet transmission controller 302 of the control station 30 and the packet transmission controller 402 of the terminal integrated controller 40. Therefore, in what follows, a communication method between the packet transmission controller 302 and the packet transmission controller 402 will be described.

(Example of Communication Control According to the Present Embodiment)

In what follows, an example of a procedure for selecting a wireless communication line through which communication data are transmitted when wireless communication is performed between the packet transmission controller 302 and the packet transmission controller 402 will be described. Here, an example of data transmission from the packet transmission controller 402 to the packet transmission controller 302 (transmission from the unmanned mobile vehicle M to the control station 30, namely, in the uplink direction) will be described.

When communication data in the uplink direction are transmitted from the packet transmission controller 402 to the packet transmission controller 302, the packet transmission controller 402 selects two or more data transmission lines based on the line state known to the communication state manager 401 and a preconfigured transmission line selection threshold.

For example, the line state known to the communication state manager 301 and the communication state manager 401 and the transmission line selection threshold are set as follows.

<Private Radio Line A>
Link state=connected
BS 10 RSSI=60 dBm
BS 10 CINR=+30 dB
MS 20 RSSI=−59 dBm
MS 20 CINR=+5 dB
<Private Radio Line R>
Link state=connected
BS 11 RSSI=−50 dBm
BS 11 CINR=+3 dB
MS 21 RSSI=−55 dBm
MS 21 CINR+35 dB
<Public Wireless Line>
Link state=connected
PS 12 RSSI=−65 dBm
BS 12 CINR=+25 dB
MS 22 RSSI=−65 dBm
MS 22 CINR=+25 dB Also, the transmission line selection threshold is set as follows.

<Transmission Line Selection Threshold>
CINR of the counterpart ≥15 dB

In this case, the packet transmission controller 402 determines to transmit communication data to the tunnel that satisfies the transmission line selection threshold, namely, the private radio line A tunnel 70 in which the CINR of BS 10 is +30 dB and the public radio line tunnel 72 in which the CINR of BS 12 is +25 dB. On the other hand, the packet transmission controller 402 controls so that communication data are not transmitted from MS 21 that establishes the private radio line B tunnel 71 in which the CINR of BS 11 is +3 dB.

Also, the packet transmission controller 302, which has received the communication data sent from the packet transmission controller 402, determines to transmit an arrival confirmation signal from the tunnels satisfying the transmission line selection threshold, namely, the private radio line B tunnel 71 in which the CINR of MS 21 is +35 dB and the public radio line tunnel 72 in which the CINR of MS 22 is +25 dB. On the other hand, the packet transmission controller 302 controls so that the arrival confirmation signal is not transmitted from BS 20 constituting the tunnel that does not satisfy the transmission line selection threshold, namely, the private radio line A tunnel 70 in which the CINR of MS 20 is +5 dB.

Also, the case above selects a wireless communication line used to transmit communication data by comparing the CINR with the transmission line selection threshold, but this is only an example. In other words, a wireless communication line may be selected based on another quality indicator (e.g., RSSI), and it as still possible to select a wireless communication line based on a plurality of quality indicators. Also, it should be clearly understood that the only wireless communication line used for the transmission of communication data is a wireless communication line in which the link state is "connected," and the wireless communication line in which the link state is "disconnected" is out of consideration.

(Summary)

As described above, the wireless communication system of the present embodiment comprises an unmanned mobile vehicle M mounted with a plurality, of mobile stations (MS 20 to MS 22) correspondent to a plurality of wireless communication lines, respectively and a control station 30 connected through a network to each base station (BS 10 to BS 12) of a plurality of wireless communication lines. The unmanned mobile vehicle M obtains the line quality of a wireless communication line, measured by each mobile station, between the mobile station and each of the corresponding base stations and transmits the obtained line quality to the control station 30. The control station obtains the line quality of a wireless communication line, measured by each base station, between the base station and each of the corresponding mobile stations and transmits the obtained line quality to the unmanned mobile vehicle M. In addition, when transmitting the same communication data using two or more wireless communication lines in combination between the control station 30 and the unmanned mobile vehicle M, the transmitting side of the communication data selects two or more wireless communication lines used for the transmission of communication data based on the line quality of each wireless communication line measured by each base station or each mobile station of the receiving side of the communication data.

In other words, when the line quality of a wireless communication line between a base station and the corresponding mobile station, measured by each base station connected to the control station 30, is received from the control station 30, the unmanned mobile vehicle M stores the data in memory and based on the line quality of each wireless communication line measured by each base station, selects two or more wireless communication lines used for the transmission of communication data directed to the control station 30.

Similarly, when the line quality of a wireless communication line between a mobile station and the corresponding base station, measured by each mobile station mounted on the mobile station M, is received from the mobile station M, the control station 30 stores the data in memory and based on the line quality of each wireless communication line measured by each mobile station, selects two or more wireless communication lines used for the transmission of communication data directed to the mobile station M.

Also, the unmanned mobile vehicle M is an example of a mobile vehicle according to the present disclosure, and the control station 30 is an example of an integrated control device according to the present disclosure. Any device suffices to implement the integrated control device once the device is connected through a network to each base station of a plurality of wireless communication lines, and the integrated control device may be, for example, provided in the final communication counterpart of the mobile vehicle (in the present embodiment, the operation command equipment 60).

According to the configuration above, the transmitting side of communication data may select a wireless communication line to be used to transmit communication data by considering the line quality of each wireless communication line on the receiving side of the communication data. Therefore, frequency resources may be effectively utilized even when the communication quality is different depending on the communication direction (uplink or downlink). As a result, it is possible to provide highly efficient and reliable wireless communication.

Here, in the present embodiment, a wireless communication line in which the line quality of the receiving side is lower than a predetermined threshold (i.e., the transmission line selection threshold) is controlled so as not to be selected as a wireless communication line used for the transmission of communication data. Since the selection scheme above prevents communication data from being transmitted through a wireless communication line which readily leads to false reception or reception failure at the receiving side, it is possible to avoid a waste of frequency resources while maintaining highly reliable wireless communication.

Also, a wireless communication line used to transmit communication data may be selected based on another scheme.

As an example, the transmitting side of communication data may select a wireless communication line to be used to transmit the communication data according to a predetermined ordering among wireless communication lines for which the line quality at the receiving side is higher than a predetermined threshold. Ordering includes, for example, setting priorities in advance. The number of wireless communication lines for selection may be fixed. Alternatively, it is equally possible to increase or decrease the number of wireless communication lines for selection according to the line quality of each wireless communication line. In other words, in the presence of a large number of wireless communication lines with good line quality, a smaller number of wireless communication lines may be set for the selection, and in the presence of a smaller number of wireless communication lines with good line quality, the number of wireless communication lines for selection may be set to be large. Also, when the number of wireless communication lines whose line quality at the receiving side is higher than a predetermined threshold is two or less, a wireless communication line whose line quality is below the predetermined threshold may be additionally selected.

As another example, the transmitting side of communication data may randomly select a wireless communication line used for the transmission of communication data among the wireless communication lines in which the line quality of the receiving side is higher than a predetermined threshold. Even in this case, the number of wireless communication lines for selection may be set to a fixed value or may increase or decrease according to the line quality of each wireless communication line. Also, when the number of wireless communication lines whose line quality at the receiving side is higher than a predetermined threshold is two or less, a wireless communication line whose line quality is below the predetermined threshold may be additionally selected.

As yet another example, the selection may be based on a configuration in which the line quality of lie receiver side is not compared with a predetermined threshold. In other words, the transmitting side of communication data may select a wireless communication line used for the transmission of the communication data in order of the highest line quality of the receiving side. Even in this case, the number of wireless communication lines for selection may be set to a fixed value or may be increased or decreased according to the line quality of each wireless communication line.

Since any of the selection schemes above prevents communication data from being transmitted through a wireless communication line which readily leads to false reception or reception failure at the receiving side, it is possible to avoid a waste of frequency resources while maintaining highly reliable wireless communication.

So far, the present disclosure has been described based on one embodiment; however, it should be understood that the present disclosure is not limited to the wireless communication system described herein but is widely applicable to other wireless communication systems. For example, instead of the unmanned mobile vehicle M, a mobile vehicle capable of carrying a person may be used for the implementation of the present disclosure.

Also, the present disclosure may be provided by a method comprising technical steps of the process above, a program instructing a processor to execute the process, or a computer-readable storage medium storing the program.

The technical scope of the present disclosure is not limited to the exemplary embodiments illustrated and described above but includes all embodiments that result in the same effect as intended by the present disclosure. In addition, the technical scope of the present disclosure may be limited by any possible combination of specific features among all the disclosed features.

INDUSTRIAL AVAILABILITY

The present disclosure relates to a wireless communication system performing route diversity transmission between a mobile vehicle and an integrated control device.

DESCRIPTION OF REFERENCE NUMERALS

M: unmanned mobile vehicle, 10-12: base station, 20-21: mobile station, 30: control station, 40: terminal integrated controller, 50: internet, 60: navigation command equipment, 70-73: tunnel, 101, 201: antenna, 102, 202: data transmitter, 103, 203: main controller, 104, 204: interface, 105, 205: terminal, 111, 211: RF unit, 112, 212: BB signal processor, 113, 213: MAC processor, 121, 221: BB transmitter, 122, 222: BB receiver, 131, 231: channel coder, 132, 232: modulator, 141, 241 demodulator, 142, 242: channel decoder, 143, 243: line quality measuring unit, 301, 401: communication state manager, 302, 402: packet transmission controller, 303-305, 403-405: line terminator, 306: interface, 406: data communication application

The invention claimed is:

1. A wireless communication system comprising:
a mobile vehicle having a plurality of mobile stations corresponding respectively to a plurality of wireless communication lines; and
an integrated control device connected to each base station of the plurality of wireless communication lines through a network, wherein
the mobile vehicle transmits line quality of a wireless communication line, measured by each mobile station mounted on the mobile vehicle, between the mobile station and the corresponding base station to the integrated control device,
the integrated control device transmits line quality of a wireless communication line, measured by each base station connected to the integrated control device, between the base station and the corresponding mobile station to the mobile vehicle, and
when the same communication data is transmitted between the integrated control device and the mobile vehicle using two or more wireless communication lines in combination, a transmitting side of the communication data selects two or more wireless communication lines used for transmission of the communication data based on the line quality of each wireless communication line measured by each base station or each mobile station of a receiving side of the communication data.

2. The system of claim 1, wherein the transmitting side of the communication data does not select a wireless communication line whose line quality at the receiving side is lower than a predetermined threshold as a wireless communication line used for transmitting the communication data.

3. The system of claim 1, wherein the transmitting side of the communication data selects a wireless communication line used for transmitting the communication data, according to predetermined priorities, among wireless communication lines whose line quality at the receiving side is higher than a predetermined threshold.

4. The system of claim 1, wherein the transmitting side of the communication data selects a wireless communication line used for transmitting the communication data, randomly, among wireless communication lines whose line quality at the receiving side is higher than a predetermined threshold.

5. The system of claim 1, wherein the transmitting side of the communication data selects a wireless communication line used for transmitting the communication data in order of the highest line quality at the receiving side.

6. A wireless communication method performed by:
a mobile vehicle having a plurality of mobile stations corresponding respectively to a plurality of wireless communication lines; and
an integrated control device connected to each base station of the plurality of wireless communication lines through a network, wherein
the mobile vehicle transmits line quality of a wireless communication line, measured by each mobile station mounted on the mobile vehicle, between the mobile station and the corresponding base station to the integrated control device,
the integrated control device transmits line quality of a wireless communication line, measured by each base station connected to the integrated control device, between the base station and the corresponding mobile station to the mobile vehicle, and
when the same communication data is transmitted between the integrated control device and the mobile vehicle using two or more wireless communication lines in combination, a transmitting side of the communication data selects two or more wireless communication lines used for transmission of the communication data based on the line quality of each wireless communication line measured by each base station or each mobile station of a receiving side of the communication data.

7. A mobile vehicle having a plurality of mobile stations corresponding respectively to a plurality of wireless communication lines for communication with an integrated control device connected to each base station of the plurality of wireless communication lines through a network, the mobile vehicle is configured to:
receive, from the integrated control device, line quality of a wireless communication line, measured by each base station connected to the integrated control device, between the base station and the corresponding mobile station; and
when the same communication data is transmitted to the integrated control device using two or more wireless communication lines in combination, select the two or more wireless communication lines used for transmitting the communication data based on the line quality of each wireless communication line measured by each base station.

* * * * *